United States Patent Office 3,445,421
Patented May 20, 1969

3,445,421
POLYOLEFINS STABILIZED WITH DERIVATIVES OF 2-FURYL ACRYLONITRILE
Kshatra Pati Singh, Montreal, Quebec, Canada, assignor to Union Carbide Canada Limited, Toronto, Ontario, Canada, a company of Canada
No Drawing. Filed Apr. 13, 1967, Ser. No. 630,499
Int. Cl. C08f 45/60
U.S. Cl. 260—45.8
7 Claims

ABSTRACT OF THE DISCLOSURE

Polymeric materials, particularly high density grades of polyethylene, are stabilized against degradation due to ultra-violet radiation by the incorporation of 2-furyl acrylonitrile derivatives, such as 1-phenyl 2-furyl acrylonitrile, having ultra-violet absorption maxima in the range of from 300 to 360 m$\mu$.

---

This invention relates to the stabilization of polymeric materials and, more particularly, to the stabilization of polyolefins such as polyethylene against degradation caused by exposure of the polymer to ultra-violet radiation. This invention also relates to polymeric materials which have been stabilized against the detrimental effects of ultra-violet radiation.

It is well known that degradation caused by exposure to ultra-violet radiation occurs in polymeric materials such as polyolefins and particularly in high density grades of polyethylene. Accordingly, it is an object of this invention to provide a class of stabilizing materials which, when incorporated in polymeric materials such as polyethylene, and particularly in high density grades of polyethylene, effectively minimize such degradation.

In accordance with the present invention, it has been found that effective stabilization of polymeric materials against degradation due to exposure to ultra-violet radiation can be obtained by the incorporation in the polymeric material of certain derivatives of 2-furyl acrylonitrile.

The stabilizers which are used in accordance with the present invention are those derivatives of 2-furyl acrylonitrile which show a maximum in their ultra-violet absorption spectra within the range of from 300 to 360 m$\mu$.

Accordingly, the present invention provides a method for the stabilization of a polymeric material against degradation caused by exposure to ultra-violet radiation which method comprises incorporating in the polymeric material a stabilizing amount of a derivative of 2-furyl acrylonitrile which has a maximum in its ultra-violet absorption spectrum within the range of from 300 to 360 m$\mu$. The invention also embraces polymeric materials which have been stabilized by the incorporation therein of such a stabilizer.

As previously stated, the stabilizers will be incorporated in the polymeric material in stabilizing amounts. In the case of high density grades of polyethylene, it has proved particularly satisfactory to incorporate from 0.01 to 1% and, more particularly, from about 0.02 to about 0.1% by weight.

Although any suitable derivatives of 2-furyl acrylonitrile as hereinbefore defined can be used, particularly effective stabilizers are those which correspond to the general formula:

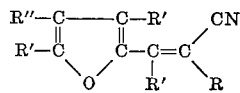

in which:

R is an aryl, pyridyl, hydroxyaryl or alkoxy carbonyl group, said alkoxy group having from one to four carbon atoms;
the R' groups, which may be the same as or different from each other, are hydrogen atoms, alkyl groups having from one to four carbon atoms, aryl groups, pyridyl groups or hydroxyaryl groups; and
R" is a hydrogen atom, a nitro group or an alkyl group having from one to four carbon atoms.

As previously stated, the invention is particularly applicable to the stabilization of high density grades of polyethylene and, for this purpose, particularly useful results have been obtained with 2-furyl acrylonitrile derivatives corresponding to the preceding formula in which the groups R, R' and R" are as follows:

R is a phenyl, naphthyl, pyridyl, ethoxy carbonyl, o-hydroxy phenyl, p-hydroxy phenyl or 2-hydroxy 4-alkyl phenyl group, in which the 4-alkyl group is a methyl, isopropyl or t-butyl group;
the R' groups, which may be the same as or different from each other, are hydrogen atoms or methyl, phenyl, naphthyl, pyridyl, o-hydroxy phenyl, p-hydroxy phenyl or 2-hydroxy 4-alkyl phenyl groups, in which the 4-alkyl group is a methyl, isopropyl or t-butyl group; and
R" is a hydrogen atom, a nitro group or a methyl group.

A particularly preferred stabilizer for use in high density grades of polyethylene is 1-phenyl 2-furyl acrylonitrile.

The stabilizers may be used in accordance with the invention either alone or, if desired, in combination with antioxidants.

The invention now will be described by way of illustration in the following example:

Example 20 g. of furfural and 26 g. of phenyl acetonitrile in solution in 40 ml. of methanol were mixed in a flask and cooled in an ice bath to 5° C. There were then added 20 ml. of a 0.5 N aqueous sodium hydroxide solution and the flask and its contents were further cooled to 0° C. The resulting pale yellow precipitate was collected and purified by recrystallization from methanol. The final product had a melting point of 41° C. and the 36 g. of powdered product recovered corresponded to a yield of 90%.

The effectiveness of the product as a stabilizer against degradation by ultra-violet radiation of a high density grade of polyethylene (density: 0.957 and melt index: 0.35) was determined by incorporating the product into the polyethylene on a two-roll mill and forming test pieces by compression molding, the test pieces having the following dimensions: 3" x 1" x 0.04".

The test pieces were exposed to the light from a 15 watt ultra-violet lamp for varying periods of time and the resulting discoloration and degree of embrittlement were noted after 18 and 30 hours. The discoloration was determined visually and given a numerical rating in the range of from 0 to 6, where 0 indicates no discoloration and 6 indicates extensive discoloration.

The degree of embrittlement was rated by the ease of cracking on repeated flexing of the specimen. As in the case of discoloration, the degree of embrittlement was rated numerically from 0 to 6 with 0 indicating no embrittlement and 6 indicating extensive embrittlement.

Details of the tests and the results obtained are given in the following table, "Product A" being the stabilizer, the preparation of which has been hereinbefore specifically described.

TABLE

| Test No. | Stabilizer, wt. percent | Antioxidant, wt. percent | Exposure 18 hours Discoloration | Exposure 18 hours Embrittlement | Exposure 30 hours Discoloration | Exposure 30 hours Embrittlement |
|---|---|---|---|---|---|---|
| 1 | None | None | 0 | 2 | 1 | 5 |
| 2 | Product A 0.05 | do | 0 | 0 | 0 | 4 |
| 3 | None | DBPC, 0.05; DLTDP, 0.05 | 0 | 2 | 0 | 3 |
| 4 | do | DBPC, 0.05; DLTDP, 0.1 | 0 | 5 | 1 | 6 |
| 5 | Product A, 0.05 | DBPC, 0.05; DLTDP, 0.05 | 0 | 0 | 0 | 2 |
| 6 | do | TBMP 0.03 | 1 | 0 | 1 | 1 |
| 7 | do | DSTDP 0.02 | 0 | 0 | 0 | 2 |
| 8 | TBS, 0.25 | DBPC, 0.025; DLTDP, 0.05 | 5 | 0 | 6 | 5 |

TBS is 4-t-butyl phenyl salicylate, DBPC is di-t-butyl p-cresol, DLTDP is di-lauryl thio-dipropionate, TBMP is 4,4′-thiobis (6-t-butyl 3-methyl) phenol, and DSTDP is di-stearyl thio-dipropionate.

From the results of Tests Nos. 1 and 2, it will be seen that the incorporation of the stabilizer (Product A) in accordance with the invention in the absence of any antioxidant resulted in the product having a considerably improved resistance to degradation.

From the results of Tests Nos. 3 to 5, it will be seen that in the absence of the stabilizer, the test pieces containing DBPC and DLTDP antioxidants showed significant embrittlement after 18 hours exposure whereas, for the test piece also containing Product A, there was no detectable embrittlement after 18 hours and less embrittlement after 30 hours than when the stabilizer was not incorporated.

It will further be seen from the results of Tests Nos. 6 and 7 that good results also were obtained with different antioxidants in combination with Product A. The results of Test No. 8 are included in the table to illustrate how much more effective is the Product A in retarding degradation due to ultra-violet radiation than is another well known ultra-violet stabilizer.

What I claim as my invention is:

1. A polyolefin composition stabilized against ultraviolet degradation comprising a polyolefin containing at least 0.01 percent by weight of a stabilizer having the general formula:

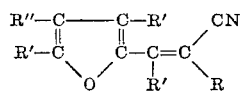

wherein
R is a radical selected from the group consisting of aryl, pyridyl, hydroxyaryl and alkoxy carbonyl and said alkoxy group has from one to four carbon atoms;
R′ is a radical selected from the group consisting of hydrogen, alkyl having from 1–4 carbon atoms, aryl, pyridyl and hydroxyaryl, and each of said R′ groups may be the same or different from each other; and
R″ is a radical selected from the group consisting of hydrogen, nitro or an alkyl having from 1–4 carbon atoms.

2. A composition as claimed in claim 1 wherein the amount of said stabilizer is 0.01 to 1.0 percent by weight of said polyolefin.

3. A composition as claimed in claim 2 wherein said polyolefin is high density polyethylene.

4. A composition as claimed in claim 3 wherein the stabilizer has the said general formula wherein:
R is a radical selected from the group consisting of phenyl, napthyl, pyridyl, ethoxy carbonyl, o-hydroxy phenyl, p-hydroxy phenyl and 2-hydroxy 4-alkyl phenyl in which said 4-alkyl is one selected from methyl, isopropyl and t-butyl;
R′ is a radical selected from the group consisting of hydrogen, methyl, phenyl, naphthyl, pyridyl, o-hydroxy phenyl, p-hydroxy phenyl and 2-hydroxy 4-alkyl phenyl, and each of said R′ groups may be the same or different from each other; and
R″ is a radical selected from the group consisting of hydrogen, nitro and methyl.

5. A composition as claimed in claim 4 wherein said stabilizer is 1-phenyl 2-furyl acrylonitrile.

6. A composition as claimed in claim 4 wherein said stabilizer is 1-phenyl 2-furyl acrylonitrile and is present in the polyethylene in an amount of from 0.02 to 1.0 percent by weight of said polyethylene.

7. A composition as claimed in claim 6 which includes an antioxidant selected from the group consisting of di-t-butyl p-cresol, di-lauryl thio-dipropionate, 4,4′-thiobis (6-t-butyl 3-methyl) phenol and di-stearyl thio-dipropionate.

References Cited

UNITED STATES PATENTS

| | | | |
|---|---|---|---|
| 3,180,885 | 4/1965 | Nentwig et al. | 260—465 |
| 3,259,627 | 7/1966 | Duennenberger et al. | 260—248 |
| 3,379,677 | 4/1968 | Dressler et al. | 260—45.8 |
| 3,379,779 | 4/1968 | Strobel et al. | 260—248 |

DONALD E. CZAJA, *Primary Examiner.*

R. R. WHITE, *Assistant Examiner.*

U.S. Cl. X.R.

260—45.85, 45.9, 45.95